Patented Apr. 10, 1951

2,548,231

UNITED STATES PATENT OFFICE 2,548,231

PREPARATION OF ACYLCARBAMYL-GUANIDINES

Daniel E. Nagy, Stamford, Conn., assignor to American Cyanamid Company, New York, N. Y., a corporation of Maine No Drawing. Application June 9, 1949, Serial No. 98,170

11 Claims. (Cl. 260—553)

This invention relates to a new class of compounds, the acylcarbamylguanidines and the acid addition salts thereof, and to methods for the preparation of such compounds.

The acylcarbamylguanidines of the present invention are of the following formula

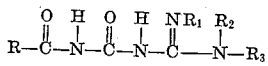

where

is the residue of an aromatic organic acid having a dissociation constant less than $1 \times 10^{-4}$, and $R_1$, $R_2$, and $R_3$ are members of the group consisting of hydrogen and alkyl and aromatic radicals, at least one of said R's being hydrogen. These compounds and the salts thereof are prepared by a process which comprises reacting a dicyandiamide of the formula

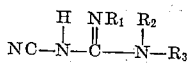

where the R's are as above defined, with an organic acid of the type defined above, in the presence of sulfuric acid as a condensing agent. Aromatic organic acids such as those above defined which may be used in the process of the invention are as follows:

Benzoic, p-isopropylbenzoic, o-benzoylbenzoic, 2,4-dimethylbenzoic, o-(p-toluyl)-benzoic, o-chlorobenzoic, m-nitrobenzoic, and β-naphthoic acid.

Heretofore, dicyandiamide has been reacted with organic acids without the presence of a strong acid condensing agent, at high temperatures and under conditions otherwise different from those employed in the present invention to obtain a mixture of products from which have been isolated materials described as acylammelines. It was not to be expected, therefore, that a dicyandiamide could be reacted with organic acids of the aforesaid type to provide the acylcarbamylguanidines, and salts thereof, of the present invention.

As indicated hereinabove, the reaction of the invention is carried out in the presence of sulfuric acid as a condensing agent. Care should be taken to avoid reaction between the dicyandiamide and the sulfuric acid, however. In observing this precaution a variety of reaction techniques may be employed, e. g., the dicyandiamide may be added to a mixture of the organic acid and the sulfuric acid or a mixture of the reactants may be added to the sulfuric acid. Other techniques more suitable for the reaction of the dicyandiamide with a specific organic acid may also be employed so long as the above consideration is kept in mind. Said consideration, however, does not prohibit the addition of an excess of the dicyandiamide to the reaction mixture when such is desired in view of the expense of the organic acid being employed. In such a case, the tendency for reaction to occur between the dicyandiamide and the sulfuric acid is ignored in order to obtain maximum yields of the acylcarbamylguanidine by using the dicyandiamide in excess. The use of lower temperatures of reaction, particularly at the time when such excess of the dicyandiamide reactant is added to the reaction mixture, is helpful in minimizing the aforementioned side-reaction.

In general, the temperatures to be employed in carrying out the reaction of the invention may be somewhat widely varied and the temperature to be used in a given case will depend somewhat upon the solubility of the organic acid in the sulfuric acid or any inert solvent that may be employed and/or upon the melting point of said organic acid. Organic acids being quite generally soluble in sulfuric acid, it is often desirable to employ the latter in appreciable excess to serve as a solvent as well as a condensing agent. Other solvents or diluents may also be used although generally their use offers no advantage over the use of sulfuric acid. When undissolved organic acid is present, vigorous stirring to keep such organic acid thoroughly distributed throughout the reaction mixture will help to provide best results. In order to obtain best results the reaction should be carried out at low temperatures whenever feasible, temperatures below about 75° C. being preferable.

While the ratio of sulfuric acid which may be employed may be varied somewhat widely, it is preferred that it be employed in a ratio of at least a mol of sulfuric acid per mol of dicyandiamide. Since, as mentioned hereinafter, it is preferred that the reaction mixture be maintained anhydrous it is best that the sulfuric acid employed be concentrated acid containing at least 95% of $H_2SO_4$ or 77.5% $SO_3$ being preferred.

While the reaction mixture does not need to be maintained anhydrous, nevertheless, best results will be found to obtain when substantially anhydrous conditions are maintained. Thus, it is advantageous, although not necessary, to employ some organic acid anhydride, corresponding to the acid to be reacted, to the reaction mixture if sulfuric acid of a concentration less than that corresponding to an $SO_3$ content of 77.5% is employed. Such anhydride reacts with the water present to form more of the organic acid and helps to maintain substantially anhydrous conditions. If desired, the acid anhydride may be added to the exclusion of the corresponding organic acid when the sulfuric acid is not sufficiently concentrated so that the organic acid is produced by reacting with the water present and the desired anhydrous conditions are thereby obtained. When fuming sulfuric acid, or oleum, is used it is unnecessary to add such organic acid anhydride.

The present invention also contemplates the preparation of the acid addition salts of the acylcarbamylguanidines. The product provided in the first instance by the process of the present invention is the sulfate of the acylcarbamylguanidine so produced. The free base is obtained therefrom by careful neutralization with a base stronger than the acylcarbamylguanidine. Such bases are sodium hydroxide, potassium hydroxide, calcium hydroxide, and the like. The free base may then be converted to the desired acid addition salt by treatment with the corresponding acid. Also, some salts of the acylcarbamylguanidines may be prepared by the double decomposition of an acylcarbamylguanidine salt and another salt, particularly when one of such salts resulting from such double decomposition is insoluble. Examples of acids suitable for forming salts of the acylcarbamylguanidines are as follows: hydrochloric, hydrobromic, nitric, sulfuric, sulfurous, pyro-sulfuric, metaphosphoric, orthophosphoric, carbonic, acetic, propionic, butyric, 2-ethylhexanoic, lauric, stearic, crotonic, oleic, malonic, chloroacetic, succinic, oxalic, maleic, sebacic, citric, lactic, α-hydroxyisobutyric, benzoic, chlorobenzoic, nitrobenzoic, salicylic, phthalic, naphthoic, p-toluenesulfonic, picric, and the like.

EXAMPLE 1

*Preparation of benzoylcarbamylguanidine*

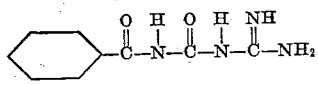

and salts thereof.

| Reactants: | Molar ratio |
| --- | --- |
| Dicyandiamide | 1.00 |
| Benzoic anhydride | 1.00 |
| Sulfuric acid, 95% | 1.95 |
| Carbon tetrachloride | 1.56 |

The sulfuric acid is carefully added to the carbon tetrachloride solution of benzoic anhydride, and heated to 55°–60° C. Vigorous mechanical stirring is needed during the slow addition of the dicyandiamide, which is added preferably in a finely divided state. A colorless solid reaction prdouct is formed, and after filtering the cake is washed with water and acetone. The solid is recrystallized from hot water to give benzoylcarbamylguanidine neutral sulfate, which yields benzoylcarbamylguanidine when carefully neutralized with ammonia in the cold. Since the salts are more stable than the free base, it is preferred to store the benzoylcarbamylguanidine as a salt.

The neutral sulfate salt melts with effervescence at 110° C., and on further heating this product solidifies at 205° C. only to decompose again at 270° C.

Benzoylcarbamylguanidine p-toluenesulfonate is prepared in water from molecular equivalent quantities of the free base and p-toluene-sulfonic acid. The salt is slightly soluble in hot water and crystallizes therefrom in clusters of needles which, when dry, melt with decomposition at 212°–213° C.

Benzoylcarbamylguanidine benzoate, being insoluble in water and acetone, is prepared in methanol from molecular equivalent quantities of the free base and benzoic acid. The dry salt softens gradually, beginning at 160° C., and decomposes at 314°–316° C.

Benzoylcarbamylguanidine nitrate is prepared from molecular equivalent quantities of the free base and nitric acid, and is soluble in water from which it crystallizes as long needles. The above dry product is a hydrate, but on heating this moisture is driven off. The nitrate salt melts at 175°–177° C. with decomposition.

The sulfamate salt of benzoylcarbamylguanidine is very soluble in water.

Treatment of benzoylcarbamylguanidine salts with alkali or heating an aqueous solution of the salt or free base results in the formation of 2-amino-4-hydroxy-6-phenyl-1,3,5-triazine, often called benzoguanide.

EXAMPLE 2

*Preparation of p-methylbenzoylcarbamylguanidine*

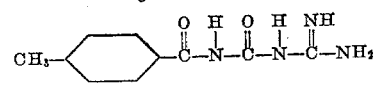

and salts thereof.

| Reactants: | Molar ratio |
| --- | --- |
| Dicyandiamide | 1.00 |
| p-Toluic acid | 0.88 |
| Sulfuric acid, 3% free SO₃ | 9.10 |

The reactants, dicyandiamide, p-toluic acid, and oleum, are mixed following substantially the same procedure as described in Example 1.

After recrystallization from hot water the p-methylbenzoylcarbamylguanidine neutral sulfate melts with effervescence at 165°–170° C., and this product solidifies at 195° C. only to darken at 270° C. and again decompose at 300° C. The free p-methylbenzoylcarbamylguanidine is prepared from an aqueous slurry of the salt by careful neutralization with ammonia. This colorless solid is recovered and dried, but it does not melt when placed in a melting point bat hand heated slowly to 316° C. However, a fresh sample sinters when it is placed in a melting point bath at 230° C. This free base, like the benzoylcarbamylguanidine, is best stored as a salt. Heating the salt or free base and treatment of either with alkali causes the formation of 2-amino-4-hydroxy-6-p-tolyl-1,3,5-triazine, sometimes called p-methylbenzoguanide, which does not melt below 315° C.

The acylcarbamylguanidines described herein do not give the characteristic copper complex which is obtained from guanylureas.

EXAMPLE 3

*Reaction of n-butyl dicyandiamide with benzoic acid*

Preparation of 1-benzoylcarbamyl-3-butylguanidine sulfate:

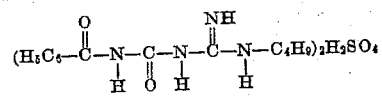

| | Grams |
| --- | --- |
| Benzoic acid, 0.5 mol | 61 |
| n-Butyl dicyandiamide, 0.5 mol | 70 |
| Sulfuric acid | 200 |
| Oleum (20–30%) | 220 |

Benzoic acid was added to the 100% sulfuric acid which was obtained by mixing sulfuric acid with oleum. Butyl dicyandiamide was then added over a 30 minute period while the temperature was kept between 20°–25° C. After stirring the reaction mixture at 15° C. for 1 hour, it was poured into 1 liter of ice water and filtered. The solid was suspended in 250 ml. water, filtered and air dried. The crude 1-benzoylcarbamyl-3-butylguanidine sulfate, M. P. 103°–110° C., weighed 40.5 g. The crude material was extracted with ether, and the ether-insoluble material was recrystallized from water. After drying over sulfuric acid at room temperature the solid melted with decomposition at 125°–132° C. The 1-benzoylcarbamyl-3-butylguanidine sulfate gave the following nitrogen analysis.

|  | Percent N |
|---|---|
| Calculated for $C_{13}H_{18}N_4O_2 \cdot \tfrac{1}{2}H_2SO_4$ | 17.02 |
| Found | 17.18 |

EXAMPLE 4

*Reaction of phenyl dicyandiamide with benzoic acid*

Preparation of 1-benzoylcarbamyl-3-phenyl-guanidine sulfate:

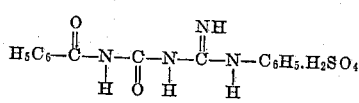

|  | Grams |
|---|---|
| Benzoic acid, 0.5 mol | 61 |
| Phenyl dicyandiamide, 0.5 mol | 80 |
| Sulfuric acid (96%) | 200 |
| Oleum (20–30% $SO_3$) | 180 |

Oleum was added to the sulfuric acid, keeping the temperature below 30° C. The benzoic acid was dissolved in the sulfuric acid and the phenyl dicyandiamide added slowly over a period of 1 hour. After stirring the mixture for 50 minutes, it was poured into ice water. The mixture was cooled in an ice bath for several hours and then filtered. The solid was suspended in 350 ml. water, filtered and the solid allowed to air dry. The crude product was extracted with ether in order to remove unreacted benzoic acid.

A portion of the resulting product was recrystallized from 50% aqueous alcohol. The crystalline solid, M. P. 212°–214° C. (decomposition), analyzed as the 1-benzoylcarbamyl-3-phenylguanidine acid sulfate.

|  | Percent N |
|---|---|
| Calculated for $C_{15}H_{14}N_4O \cdot H_2SO_4$ | 14.74 |
| Found | 14.66, 14.92 |

EXAMPLE 5

*Reaction of 1,1-dibutyl dicyandiamide with benzoic acid*

Preparation of 1-benzocarbamyl-3-dibutyl-guanidine sulfate:

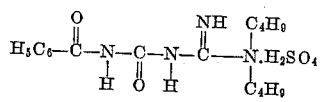

|  | Grams |
|---|---|
| Benzoic acid, 0.5 mol | 61 |
| Dibutyl dicyandiamide, 0.5 mol | 98 |
| Sulfuric acid (96%) | 200 |
| Oleum (20–30% $SO_3$) | 180 |

The procedure was the same as that used in the preceding example. The reaction temperature went as high as 62° C.

The reaction mixture was poured into 600 ml. water. After cooling for several hours the oil solidified. The mixture was filtered and the crude 1-benzocarbamyl-3-dibutylguanidine sulfate, now a waxy solid, was suspended in 800 ml. cold water. The following day the product was in the form of an oily layer. The aqueous portion and the oil were extracted with ether to remove benzoic acid, after which the product was water soluble. The product was purified by recrystallization from acetone. The solid, after filtration and drying, melted with decomposition at 148°–150° C. and analyzed as the 1-benzocarbamyl-3-dibutylguanidine acid sulfate.

|  | Percent N |
|---|---|
| Calculated for $C_{17}H_{26}N_4O_2$ | 13.46 |
| Found | 13.30 |

EXAMPLE 6

*Reaction of phenyl dicyandiamide with p-toluic acid*

Preparation of 1-p-toluylcarbamyl-3-phenylguanidine acid sulfate

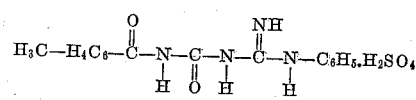

|  | Grams |
|---|---|
| p-Toluic acid, 0.33 mol | 45.3 |
| Phenyl dicyandiamide, 0.33 mol | 53.3 |
| Sulfuric acid (96%) | 134 |
| Oleum (20–30% $SO_3$) | 120 |

The procedure was the same as in the preceding example. Finely divided solid separated when the reaction mixture was poured into ice water. The mixture filtered slowly. The solid was suspended in water, the mixture filtered and the solid air dried. 5 g. of product was crystallized from aqueous methyl Cellosolve in which it was slightly soluble. After drying in Abderhalen apparatus the crystalline solid melted with decomposition at 214° C. and gave the following nitrogen analysis.

|  | Percent N |
|---|---|
| Calculated for $C_{10}H_{16}N_4O_2 \cdot H_2SO_4$ | 14.22 |
| Found | 14.42 |

Acids which react with sulfuric to form sulfonated materials are preferred to be reacted with sulfuric acid prior to their reaction with the dicyandiamide. Acids which are subject to this condition are those containing hydroxyl groups, aliphatic unsaturation, and others susceptible to sulfonation and/or reaction with the acid acting as the condensing agent for the reaction of the present invention.

The acylcarbamylguanidine salts of this invention are themselves intermediates and latent curing agents for resins and are useful in the preparation of other chemical intermediates, textile chemicals, plastics, resins, and the like.

While this invention has been described with reference to specific embodiments, it is to be understood that it is not to be limited thereto but is to be construed broadly and restricted solely by the scope of the appended claims.

The present application is a continuation-in-part of Serial No. 741,680, filed April 15, 1947, now U. S. Patent 2,481,526, the latter being a continuation-in-part of Serial No. 579,304 and Serial No. 579,305, both abandoned.

I claim:

1. A method of preparing a member of the group consisting of an acylcarbamylguanidine of the formula

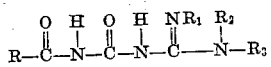

and an acid addition salt thereof, where

is the residue of an aromatic acid having a dissociation constant less than $1\times10^{-4}$, and $R_1$, $R_2$ and $R_3$ are members of the group consisting of hydrogen, alkyl, and aromatic hydrocarbon radicals, which comprises mixing together a dicyandiamide of the formula

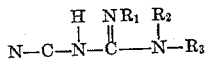

where the R's are as above defined, with an organic acid of the type above defined, and sulfuric acid and allowing the said substances to remain in contact with each other until an acylcarbamylguanidine has been formed.

2. A method of preparing an acylcarbamylguanidine of the formula

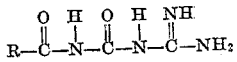

where

is the residue of an aromatic acid having a dissociation constant less than $1\times10^{-4}$, which comprises mixing together dicyandiamide, an organic acid of the type above defined, and sulfuric acid, and allowing the said substances to remain in contact with each other until an acylcarbamylguanidine has been formed adding a base to free the acylcarbamylguanidine, and recovering the thus-formed acylcarbamylguanidine.

3. A method of preparing an acid addition salt of an acylcarbamylguanidine of the formula

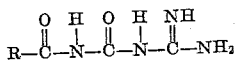

where

is the residue of an aromatic acid having an dissociation constant less than $1\times10^{-4}$, which comprises mixing together dicyandiamide, an organic acid of the type above defined, and sulfuric acid and allowing the said substances to remain in contact with each other until an acylcarbamylguanidine has been formed.

4. A method of claim 1 in which the sulfuric acid has an $SO_3$ content of at least 77.5%.

5. The method of claim 1 in which the sulfuric acid has an $SO_3$ content of at least 77.5% and at least a mol of sulfuric acid is employed per mol of dicyandiamide.

6. The method of claim 1 in which the sulfuric acid has an $SO_3$ content of at least 77.5%, at least a mol of sulfuric acid is employed per mol of dicyandiamide, and the temperature of reaction is maintained below 75° C.

7. The method according to claim 1 in which dicyandiamide is added to a mixture of the organic acid and sulfuric acid of at least 77.5% $SO_3$ content, at least 1 mol of sulfuric acid being employed per mol of dicyandiamide, and the temperature being maintained below 75° C.

8. The method according to claim 1 in which a mixture of dicyandiamide and the organic acid is added to sulfuric acid of at least 77.5% $SO_3$ content, at least a mol of sulfuric acid being employed per mol of dicyandiamide, and the temperature of reaction being maintained below 75° C.

9. A method of preparing an addition salt of benzoylcarbamylguanidine, which comprises reacting dicyandiamide and benzoic acid by adding dicyandiamide to a mixture of benzoic acid and sulfuric acid of at least 77.5% $SO_3$ content, a mol of sulfuric acid being employed per mol of dicyandiamide, and the temperature of reaction being maintained below 75° C.

10. A method of preparing benzoylcarbamylguanidine, which comprises reacting dicyandiamide and benzoic acid by adding dicyandiamide to a mixture of benzoic acid and sulfuric acid of at least 77.5% $SO_3$ content, a mol of sulfuric acid being employed per mol of dicyandiamide, and the temperature of reaction being maintained below 75° C., adding a base to free the benzoylcarbamylguanidine, and removing the thus-formed benzoylcarbamylguanidine.

11. A method of preparing an acid addition salt of p - methylbenzoylcarbamylguanidine, which comprises reacting dicyandiamide and p-toluic acid by adding dicyandiamide to a mixture of p-toluic acid and sulfuric acid of at least 77.5% $SO_3$ content, a mol of sulfuric acid being employed per mol of dicyandiamide and the temperature of reaction being maintained below 75° C.

DANIEL E. NAGY.

REFERENCES CITED

The following references are of record in the file of this patent:

UNITED STATES PATENTS

| Number | Name | Date |
| --- | --- | --- |
| 2,397,667 | Kaiser et al. | Apr. 2, 1946 |
| 2,481,526 | Nagy | Sept. 13, 1949 |

OTHER REFERENCES

Ostrogovich: "Ga. Chim. Ital.," vol. 39T (1909) pp. 540–542